United States Patent [19]
Burckhardt et al.

[11] 3,707,852
[45] Jan. 2, 1973

[54] SEALING SLEEVE OF ELASTIC MATERIAL

[75] Inventors: Manfred H. Burckhardt, Waiblingen; Lutz Schafer, Stuttgart-Bad Cannstatt, both of Germany

[73] Assignee: Daimler-Benz Aktiengesellschaft, Stuttgart-Unterturkheim, Germany

[22] Filed: Sept. 27, 1968

[21] Appl. No.: 763,274

[30] Foreign Application Priority Data

Sept. 28, 1967 Germany.....................P 16 25 974.8

[52] U.S. Cl. .....................64/32 F, 74/18.1, 277/205
[51] Int. Cl...............................................F16d 3/84
[58] Field of Search....64/32, 32 F; 74/18.1; 277/205

[56] References Cited

UNITED STATES PATENTS

| 2,781,649 | 2/1957 | Stahl et al............................64/32 X |
| 3,260,071 | 7/1966 | Westercamp............................64/32 |
| 3,468,171 | 9/1969 | Macielinski..........................74/18.1 |

Primary Examiner—Milton Kaufman
Attorney—Craig, Antonelli & Hill

[57] ABSTRACT

A sealing sleeve made from elastic material, particularly for sealing the gap between a joint part and a shaft in rapidly rotating, so-called homo-kinetic joints, in which the inner ring of the sealing sleeve abuts sealingly against the shaft and the outer ring against a joint part, whereby the outer ring and the inner ring are connected with each other by a conically constructed ring diaphragm which is deformable into a roller bellows in the installed position.

11 Claims, 7 Drawing Figures

PATENTED JAN 2 1973 3,707,852

INVENTORS
MANFRED H. BURCKHARDT
LUTZ SCHÄFER

BY Craig & Antonelli

ATTORNEYS

SEALING SLEEVE OF ELASTIC MATERIAL

The present invention relates to a sealing sleeve of elastic material, especially for sealing the gap between the joint part and the shaft of rapidly rotating, so-called homokinetic joints, which consists of an inner ring and of an outer ring abutting in sealing relationship against the shaft and against the joint part, respectively.

Roller-type bellows have been used heretofore for sealing such types of joints. These roller-type bellows are basically manufactured and vulcanized in the usually rounded-off or curved configuration, in which they are inserted during the operation. The prior art types of seals, however, entail the disadvantage that the pre-set rounding-off opposes any rolling motion by reason of the stresses occurring thereby which leads to a cross-fold formation during an angular deflection of the joint at those places which are disposed in a plane extending at an angle displaced by 90° to the angular deflection plane. In case of contact of the folds or pleats with a place of the joint or in case of mutual contact, the roller bellows abrades and wears rapidly. Additionally, the stresses during high rotational speeds of about 6,000 to 7,000 rpm. lead to endurance failures in the roll radius.

The present invention aims at creating a sealing sleeve which avoids these disadvantages and more fully satisfies the requirements especially with rapidly rotating, homokinetic joints. The present invention essentially consists in that the outer ring and the inner ring of the sealing sleeve are connected with each other by a conically shaped ring diaphragm which is deformable into a roller-type bellows only in the installed position. The roll radius, which forms itself in the installed condition, is thereby able to form at any suitable place corresponding to the given angular deflection with constant pre-stress. Additionally, the stress directions within the diaphragm are maintained so that the endurance limit and fatigue strength are increased.

The usual roller-type bellows are so installed into the joints that the concave side thereof is directed outwardly. During heating-up of the joint, the roller bellows may snap outwardly as a result of the excess pressure then occurring on the inside, whereby it bursts as a rule. In order to avoid this disadvantage, provision may be made according to the present invention that the concave side of the roller bellows in directed inwardly. With such an arrangement, the roller bellows is stressed only in tension also in the presence of an internal excess pressure, which leads to stable equilibrium conditions.

An extraordinarily advantageous type of construction of a sealing sleeve is obtained in accordance with the present invention if the cone angle of the annular diaphragm amounts to between 30° and 50°. The displacement of the roll radius as a result of the centrifugal force of the roller bellows and of the liquid lubricant at higher speeds is properly taken into consideration thereby as it is also assured simultaneously that with the usual deflection angles of the joint, the opposite side of the roller bellows still possesses a roll radius.

The formation of the roller bellows can also be realized by inverting or axially displacing the outer ring. With this construction, a larger roll-range results because the counter-bending forces resulting from the overturning or inverting can be absorbed directly at the securing place at the joint part whereas with the other types of constructions, the counter-bending forces have to be absorbed by the diaphragm on the side of the shaft. Provision may also be made advantageously that the outer ring is secured on the outside of the joint part by means of a clamping ring.

Accordingly, it is an object of the present invention to provide a sealing sleeve of elastic material, particularly for homokinetic joints, which avoids by simple means the aforementioned shortcomings and drawbacks encountered heretofore in the prior art.

Another object of the present invention resides in a sealing sleeve of elastic material which minimizes the danger of wear and endurance failures while at the same time increases the fatigue limit.

A further object of the present invention resides in a sealing sleeve, particularly for homokinetic joints, which avoids the danger of bursting, particularly under high rotational speeds while assuring stable equilibrium conditions under all operating conditions.

These and further objects, features, and advantages of the present invention will become more obvious from the following description when taken in connection with the accompanying drawing which shows, for purposes of illustration only, several embodiments in accordance with the present invention, and wherein.

Figure 1:
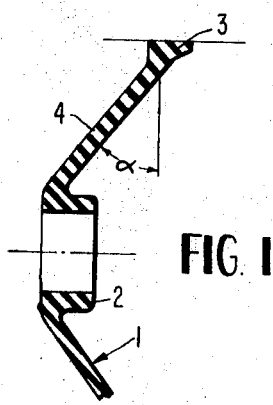
FIG. 1 is an axial cross-sectional view through a sealing sleeve made in accordance with the present invention in its unstressed or relieved condition prior to installation.
Figure 2:
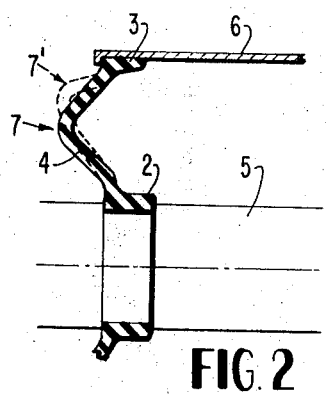
FIG. 2 is a somewhat schematic view of the sealing sleeve according to FIG. 1 installed into a joint.
Figure 3:
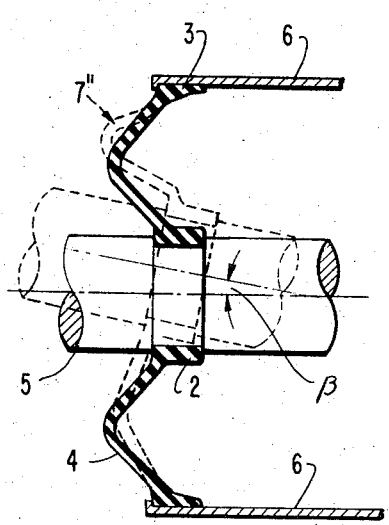
FIG. 3 is a cross-sectional view through the sealing sleeve of FIG. 2 with the joint angularly deflected.

Referring now to the drawing wherein like reference numerals are used throughout the various views to designate like parts, with the sealing sleeve of the present invention generally designated by reference numeral 1 according to FIGS. 1 and 2, the manufactured or vulcanized shape thereof is separate and distinct from the installed shape. The sealing sleeve 1 is, as can be seen from FIG. 1, so heated (vulcanized) that the inner ring 2 and the outer ring 3 are connected with each other by a conical annular diaphragm 4 under a cone angle $\alpha$ of about 30° 50° to a line perpendicular to the axis. During the installation according to FIG. 2, for example, the inner ring 2 is axially displaced or inverted toward the inside and is enlarged and drawn over a shaft 5. The outer ring 3 is secured at the joint part 6. The roll-radius generally designated by reference numeral 7 and illustrated in FIG. 2 is formed thereby. During an angular deflection of the joint up to the usually maximum possible angle $\beta$ of 8°, the roll-radius 7' moves without noticeable change of the stress and without the formation of cross folds or pleats toward the place conditioned by the angular deflection, as indicated in dash line in FIG. 3.

The optimum cone angle is dependent, on the one hand, from the rotational speed and therewith the centrifugal force of the roller bellows and from the heating-up of the joint which brings about an internal excess pressure and, on the other, from the required deflection angle. With higher rotational speeds, up to about 7,000 rpm. the roll-radius 7' is displaced outwardly by the influence of the centrifugal force of the sealing sleeve 1 and of the liquid lubricant, as indicated in dash line in FIG. 2.

In the thus resulting end position, the outside of the diaphragm should move at most up to the axial position as otherwise bending-stress endurance failures result from an excessive stretching of the clamping place, above all, with an angularly deflected joint. With the different securing possibilities which are illustrated in the embodiments according to FIGS. 4 to 7, a larger buckling of the diaphragm could lead to contact with the outer parts of the joint part 6 and therewith to chaffing and wear which would have as a consequence the destruction of the sealing sleeve 1. For that reason, the cone angle $\alpha$ should possibly not exceed 50° during the manufacture of the sealing sleeve 1. If the cone angle is kept smaller than 30°, then the roller bellows is pulled completely straight at the side opposite the deflection angle, dependent on the deflection angle of the joint. No roll-radius could then form any longer. If additionally an axial displaceability of the joint is required, then the cone angle $\alpha$ has to be increased again correspondingly.

In summary, it may be stated that the higher the rotational speed of the sealing sleeve 1, the smaller should be the cone angle $\alpha$. With a larger deflection angle of the joint and with larger axial displaceability, the cone angle $\alpha$, however, has to be increased again. The optimum for both of these contradictory requirements lies approximately in the middle with a cone angle $\alpha$ of 40°.

Figure 4:
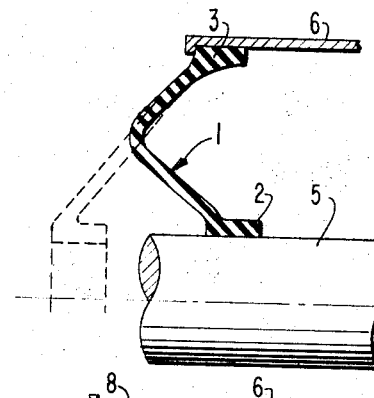
FIGS. 4 through 7 are partial cross-sectional views, on a reduced scale, of several embodiments of installation arrangements of sealing sleeves in accordance with the present invention.

The sealing sleeve 1 is assembled with a pre-stress, as illustrated in FIG. 1, in that the inner ring 2 is enlarged. The formation of the roll-radius 7 can take place by axially displacing or inverting of the inner ring 2 or of the outer ring 3 either at the shaft 5 or at the joint part 6. In case of inverting or axially displacing the inner ring 2, the securing of the sealing sleeve 1 at the joint part 6 may be realized in such a manner that the outer ring 3 is vulcanized, glued or bonded in any conventional manner to the sheet metal pot of the joint part 6 (FIG. 4).

Figure 5:
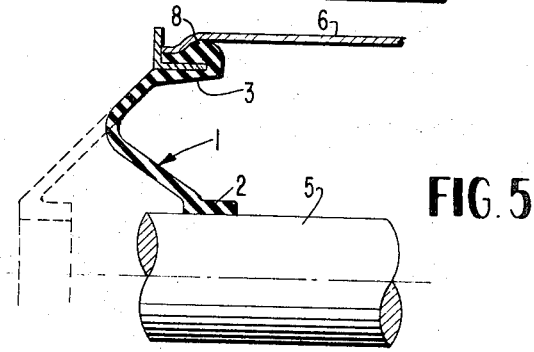

The embodiment according to FIG. 5 shows a clip-type fastening arrangement inwardly at the sheet metal pot of the joint part 6 whereby the inner ring 2 is also inverted or overturned on the shaft 2. With this type of securing, the outer ring 3 is reinforced by a sheet metal member 8, preferably vulcanized into the outer ring and snaps-in with a bead thereof over a flange portion of sheet metal part 6 from the inside.

Figure 6:
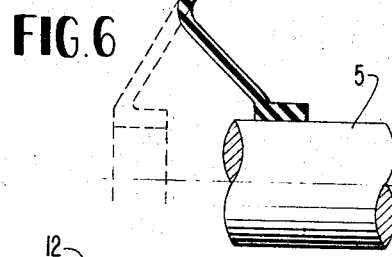

In the embodiment according to FIG. 6, a clip-type fastening arrangement of the outer ring at the sheet metal pot of the joint part 6 is also provided in which the outer ring snaps-in with a bead thereof over a flange portion of sheet metal part 6 from the outside. For that purpose, the outer ring is provided with rubber beads 9 which snap over a flanged edge of the sheet metal pot 6. Also, in this case a sheet metal ring 10 is provided for the reinforcement. For the purpose of a better seal in case of excess pressures by reason of higher rotational speeds, a sealing lip of conventional construction may also be added.

Figure 7:
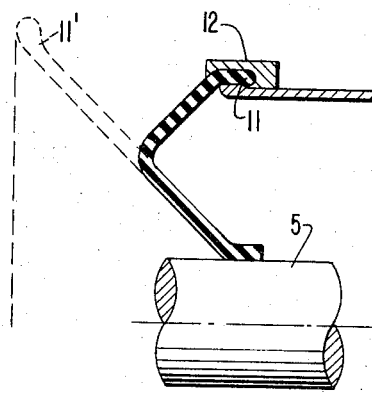

In the embodiment according to FIG. 7, the outer ring consisting essentially of a bead 11 is overturned or inverted inwardly (11'-11) and is secured on a flanged edge of the sheet metal pot of the joint part 6 by means of a clamping ring 12. With this type of inverting, a larger roll-range results because the counter-bending forces of the inverting action can be directly absorbed in the clamp means whereas the inverting with the other embodiments has to be absorbed by the diaphragm 4 on the side of the shaft.

While we have shown and described several embodiments in accordance with the present invention, it is understood that the same is not limited thereto but is susceptible of numerous changes and modifications as known to a person skilled in the art, and we therefore do not wish to be limited to the details shown and described herein, but intend to cover all such changes and modifications as are within the scope of those skilled in the art.

It is claimed

1. A gasket-type sealing arrangement comprising: two mutually movable parts including a joint section and a shaft with a gap therebetween, which rotate together, a gasket of elastic material having an inner ring portion and an outer ring portion installed between said mutually movable parts and contacting said shaft and joint section, respectively, and further having the shape of a roller bellows connecting said inner and outer ring portions, said gasket formed of an annular membrane which is pre-stressed so that the membrane seeks to assume a conical shape, and said ring portions positioned to hold said membrane from its unstressed conical shape.

2. A sealing arrangement gasket is directed toward the side of the joint to be sealed.

3. A sealing arrangement according to claim 2, wherein the cone angle of the membrane amounts to about 30° to 50°.

4. A sealing arrangement according to claim 3, wherein the formation of the roller bellows is created by the displacement of said inner ring portion along the axis of said shaft.

5. A sealing arrangement according to claim 4, wherein the outer ring portion is secured at the joint section on the side thereof facing said shaft.

6. A sealing arrangement according to claim 4, wherein the outer ring portion is secured on the outside of the joint section.

7. A sealing arrangement according to claim 3, wherein the formation of the roller bellows is realized by an inverting bead provided at the outer ring portion.

8. A sealing arrangement according to claim 7, wherein said bead provided at the outer ring portion is secured on the outside of the joint section by a clamping ring.

9. A sealing arrangement according to claim 1, wherein the cone angle of the deformable membrane amounts to about 30° to 50°.

10. A sealing arrangement according to claim 1, wherein the formation of the roller bellows is created by the displacement of said inner ring portion along the axis of said shaft.

11. A sealing arrangement according to claim 10, wherein the outer ring portion is secured at the joint section on the inside thereof.

* * * * *